United States Patent [19]

Kobayashi et al.

[11] Patent Number: 4,462,360
[45] Date of Patent: Jul. 31, 1984

[54] ENGINE IDLING ROTATIONAL SPEED CONTROL DEVICE

[75] Inventors: Nobuyuki Kobayashi; Hiroshi Ito; Takahide Kuma, all of Aichi, Japan

[73] Assignee: Toyota Jidosha Kabushiki Kaisha, Toyota, Japan

[21] Appl. No.: 407,172

[22] Filed: Aug. 11, 1982

[30] Foreign Application Priority Data

Aug. 13, 1981 [JP] Japan .............................. 56-126889

[51] Int. Cl.³ ............................................. F02D 33/00
[52] U.S. Cl. .................................... 123/339; 123/340; 123/352
[58] Field of Search ............... 123/339, 340, 327, 352, 123/585, 588

[56] References Cited

U.S. PATENT DOCUMENTS

| | | | |
|---|---|---|---|
| 4,191,051 | 3/1980 | Kawata et al. ....................... | 123/339 |
| 4,237,833 | 12/1980 | Des Lauriers ....................... | 123/339 |
| 4,306,527 | 12/1981 | Kinugawa et al. .................. | 123/327 |
| 4,378,768 | 4/1983 | Itoh et al. ............................. | 123/339 |

FOREIGN PATENT DOCUMENTS 56-138442 10/1981 Japan .................................. 123/339

*Primary Examiner*—Andrew M. Dolinar
*Attorney, Agent, or Firm*—Cushman, Darby & Cushman

[57] ABSTRACT

A stepping motor is driven to control an opening area of an intake air flow rate control valve such that an engine rotational speed in a substantially full-close position of a throttle valve is brought into a target rotational speed range related to at least an engine coolant temperature. An intake air quantity into an engine and engine rotational speed are detected to determine a ratio of the intake air quantity to the engine rotational speed. Downward control to the intake air flow rate control valve is inhibited when a ratio of intake air quantity into an engine to the engine rotational speed is smaller than a predetermined reference.

7 Claims, 7 Drawing Figures

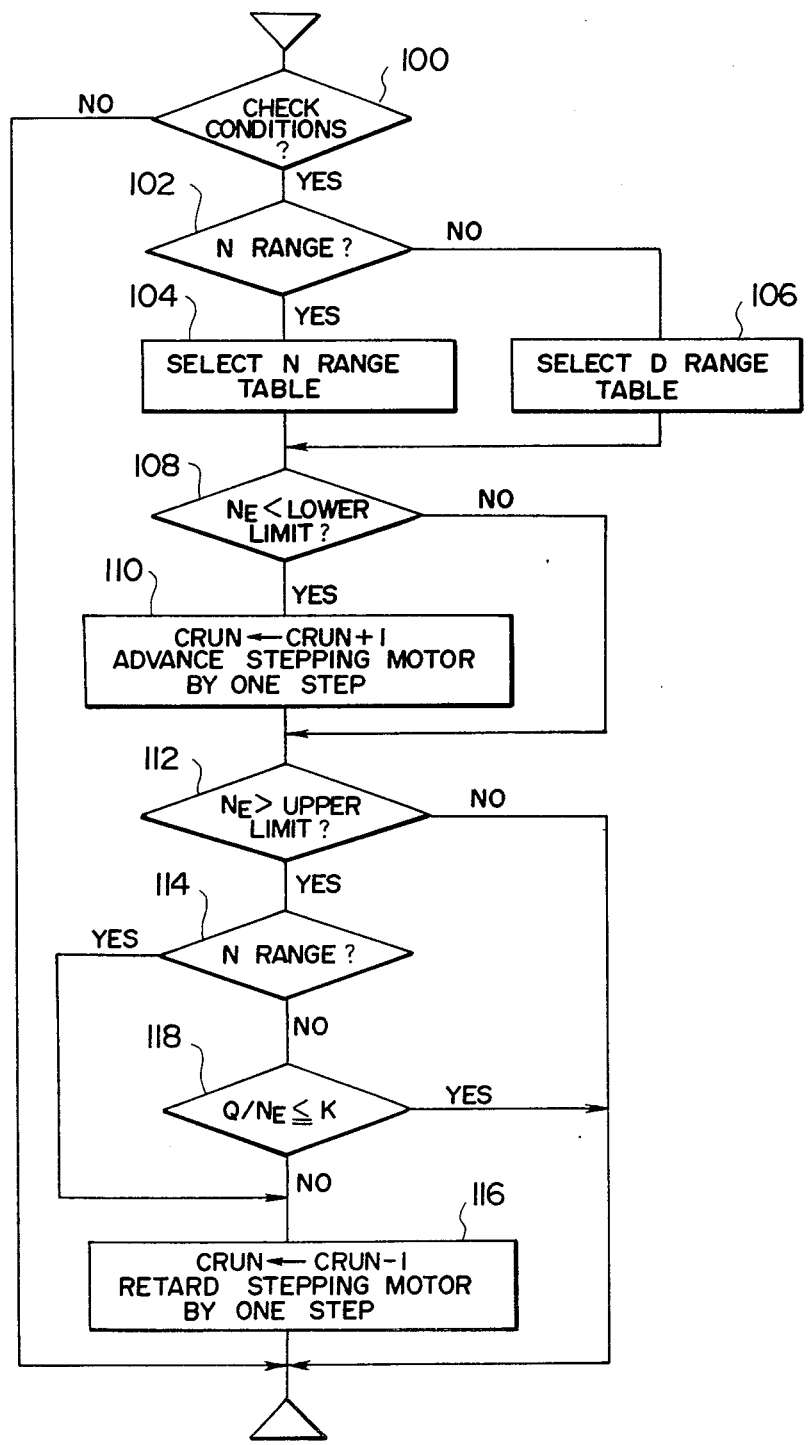

ENGINE IDLING ROTATIONAL SPEED CONTROL DEVICE

BACKGROUND OF THE INVENTION

1. Field of the Invention

The present invention relates to an engine idling rotational speed control device, and more particularly to an engine rotational speed control device for controlling an idling rotational speed of an engine.

2. Description of the Prior Art

In an engine such as an automobile engine, an engine rotational speed control device is usually used in order to maintain smooth rotation of the engine even when a throttle valve is in a full-close position by removal of a foot of a driver from an accelerator pedal in a non-load condition. One type of the engine rotational speed control device comprises intake air flow rate control means for controlling an intake air quantity in the idling position of the engine of the full-close position of the throttle valve, a stepping motor for driving the intake air flow rate control means and an electronic control circuit for controlling the stepping motor in accordance with the operating condition of the engine.

When such a device is used in an engine having an electronically controlled fuel injection device including a throttle body in which the throttle valve for controlling the intake air quantity is arranged and a fuel injection device for injecting fuel to air suctioned into an intake manifold through the throttle body, a bypass passage for bypassing the throttle valve of the throttle body is provided to control the opening area of the bypass passage by the intake air flow rate control valve driven by the stepping motor in the idling condition or the full-close position of the throttle valve in order to control the intake air quantity in the idling condition. With the idling rotational speed control device provided with the air flow rate valve driven by the step motor as described above, in the electronic control circuit, the increase or decrease in pulse number for driving the step motor from the reference position is calculated, whereby the opening degree of the air flow rate control valve is brought into register with the position of the step motor stored in the electronic control circuit, so that the opening degree of the air flow rate control valve can be detected.

As shown in FIG. 1, in the prior art device, when an ignition switch is turned off from its on position at a time $t_1$, the stepping motor is driven to fully open the control valve at a time $t_2$ in order to prevent freeze in a low temperature environment. As the engine is in a full operation at a time $t_3$, the flow rate control valve is abruptly closed by the stepping motor (see a time period between $t_3$ and $t_4$) to attain an idling rotational speed set in accordance with an engine coolant temperature. After a time $t_4$, the step position of the stepping motor is corrected such that a target idling rotational speed for the engine coolant temperature is attained and the step position of the stepping motor is controlled to maintain the target idling rotational speed.

In this manner, the engine idling rotational speed is controlled to attain the target rotational speed for the coolant temperature. This control is attained when the following conditions are met; a throttle sensor is on, a motor vehicle speed sensor indicates that a vehicle speed is no higher than several Km/h, and a predetermined time period has elapsed since the start control for driving the stepping motor to a predetermined position (time $t_4$ in FIG. 1) after the start of the engine was completed. If the vehicle speed signal is not produced during the running of the vehicle by a failure of the vehicle speed sensor or the break of a wire between the vehicle speed sensor and the electronic control circuit, the above conditions may be met when the vehicle speed is decelarated. In such a case, the engine may stall.

SUMMARY OF THE INVENTION

It is an object of the present invention to provide an engine idling rotational speed control device which prevents the engine stall when a vehicle speed signal from a vehicle speed sensor is not produced by a failure of the vehicle speed sensor and a vehicle speed is decelerated, so that a reliability of an engine is enhanced.

In accordance with the present invention, there is provided an engine idling rotational speed control device comprising:

a throttle valve arranged in a first air intake passage;

intake air flow rate control means arranged in a second air intake passage for controlling intake air quantity taken from said second air intake passage into an engine;

a rotational speed sensor for sensing a rotational speed of said engine;

an air flow rate sensor for sensing air quantity taken into said engine; and an electronic control circuit for driving said intake air flow rate control means such that the rotational speed of said engine in a substantially full-close position of said throttle valve is brought into a target rotational speed range related to at least an engine coolant temperature, comparing a value related to the intake air quantity sensed by said air flow rate sensor and the engine rotational speed sensed by said rotational speed sensor with a reference, determining, based on the result of comparison, if said intake air flow rate control means is to be driven in a manner to decrease the air quantity taken from said second air intake passage, and, if the decision is negative, inhibiting downward control to said intake air flow rate control means.

BRIEF DESCRIPTION OF THE DRAWINGS

FIG. 7 is a flow chart illustrating the operation of the embodiment of FIG. 2.

DETAILED DESCRIPTION OF THE PREFERRED EMBODIMENT

Figure 2:
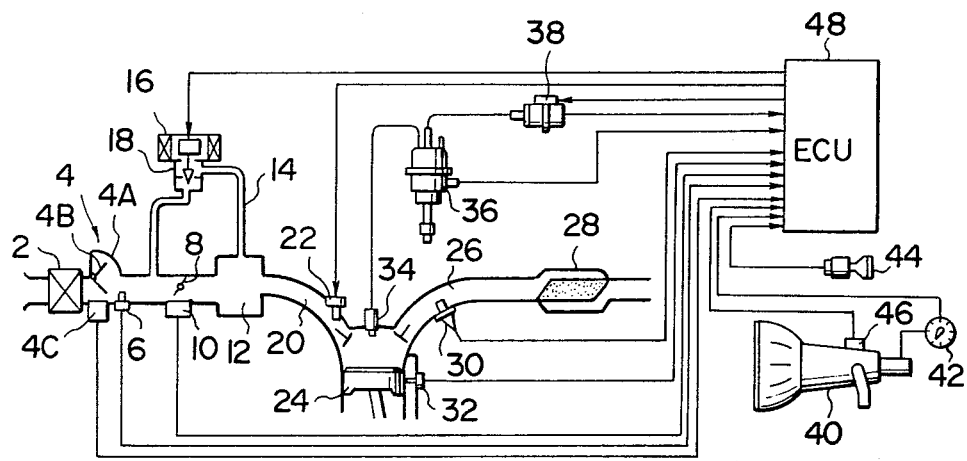
FIG. 2 is a block diagram illustrating one embodiment of the present invention.

FIG. 2 shows a block diagram of one embodiment of the engine rotational speed control device of the present invention. Detailed description will hereunder be given of such device that is applied to an automatic transmission car. The present embodiment has an air cleaner 2 and an air flow meter 4, which functions as an intake air quantity sensor, arranged downstream of the air cleaner 2. The air flow meter 4 comprises a compensation plate 4B pivotably mounted in a damping chamber 4A and a potentiometer 4C for sensing an opening angle of the compensation plate 4B. The intake air quantity is thus sensed as a voltage from the potentiometer 4C. An intake air temperature sensor 6 for sensing a temperature of the intake air is arranged in the vicinity of the air flow meter 4.

A throttle valve 8 is arranged downstream of the air flow meter 4, and a throttle sensor 10 such as a throttle switch for sensing an opening area of the throttle valve 8 to produce a throttle position signal is arranged in the vicinity of the throttle valve 8. Provided downstream of the throttle valve 8 is surge tank 12 to which a bypass passage 14 for bypassing the throttle valve 8 is connected. An intake air flow rate control valve 18 which is controlled by a stepping motor 16 is arranged in the bypass passage 14. In general, in an idling condition of the engine, the intake air bypassed the throttle valve 8 flows into the surge tank 12 through the intake air flow rate control valve 18. As will be described later, the opening area of the control valve 18 is feedback-controlled in order to maintain a desired engine idling rotational speed which is related to an operating condition of a motor vehicle.

An intake manifold 20 is connected to the surge tank 12 and a fuel injection device 22 is arranged to extend into the intake manifold 20. The intake manifold 20 is connected to a combustion chamber of an engine 24, which is connected to a catalyst converter 28 filled with a three-way catalyst, through an exhaust manifold 26. Numeral 30 denotes an $O_2$ sensor for controlling an air-to-fuel ratio of a gas mixture to a vicinity of a stoichiometric air-to-fuel ratio, and numeral 32 denotes a coolant temperature sensor for sensing a temperature of an engine coolant.

Ignition plugs 34 of the engine 24 are connected to a distributor 36 which is connected to an igniter 38. Numeral 40 denotes a transmission, numeral 42 denotes a vehicle speed sensor and numeral 44 denotes an ignition switch. The transmission gear 40 is provided with a shift position sensor 46 having a neutral start switch for sensing a neutral position and a drive position of a shift lever.

The distributor 36 is provided with a gear-shaped signal rotor or a timing rotor fixed to a distributor shaft and a pickup mounted on a housing of the distributor 36 to oppose to teeth of the signal rotor. As the signal rotor rotates, the amount of magnetic flux which link to the pickup changes so that an engine rotational speed signal is produced. The signal rotor and the pickup form an engine rotational speed sensor.

Figure 3:
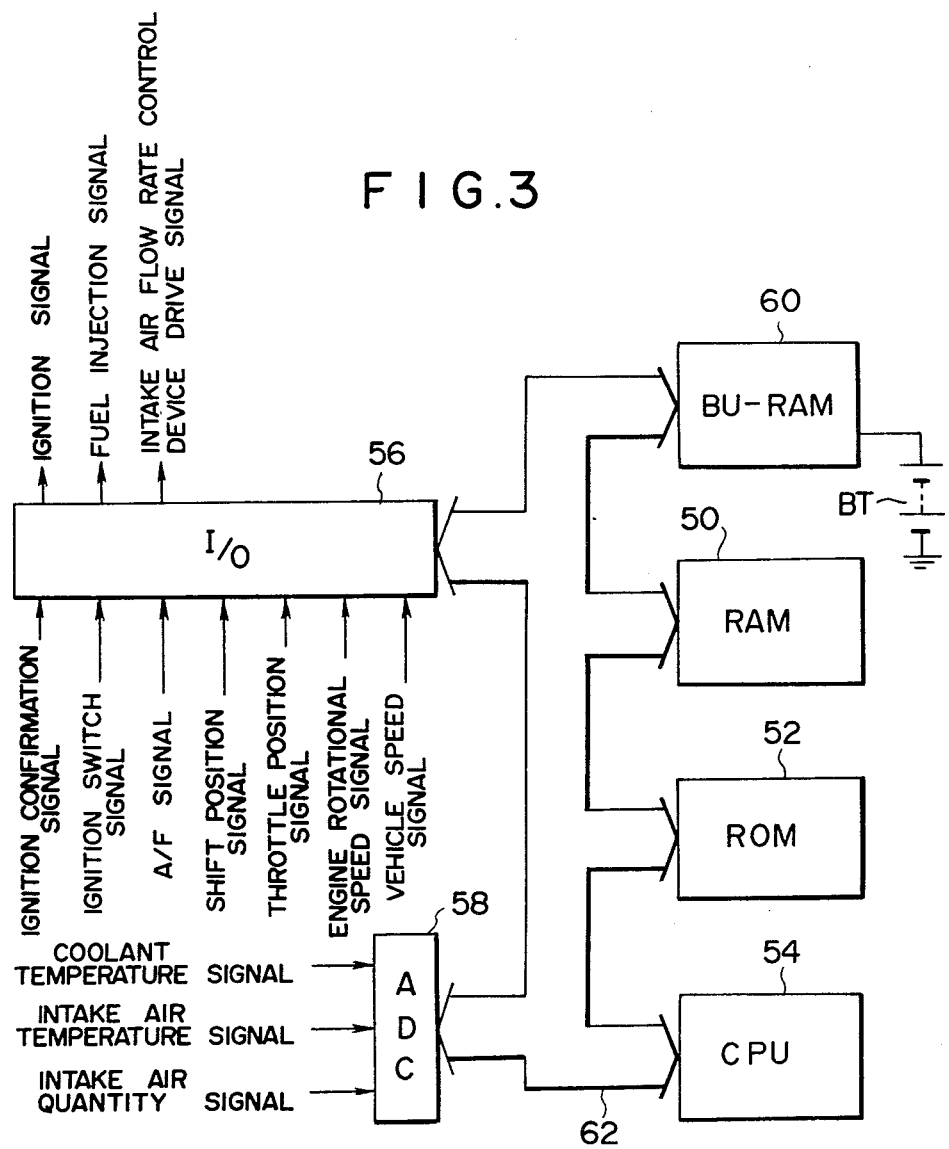
FIG. 3 is a block diagram illustrating an electronic control circuit used in the embodiment of FIG. 2.

Referring to FIG. 3, an electronic control circuit 48 which receives signals from the vehicle speed sensor 42, the shift position sensor 46 and other sensors comprises a random access memory (RAM) 50, a read-only memory (ROM) 52, a central processing unit (CPU) 54, an input/output circuit (I/O) 56, an analog-to-digital converter (ADC) 58 and a backup random access memory (BU-RAM) 60. The BU-RAM 60 is powered from a separate battery BT and a memory content thereof is not erased by other than write instruction. The RAM 50, ROM 52, CPU 54, I/O 56, ADC 58 and BU-RAM 50 are interconnected through a bus 62 including a data bus.

Figure 4:
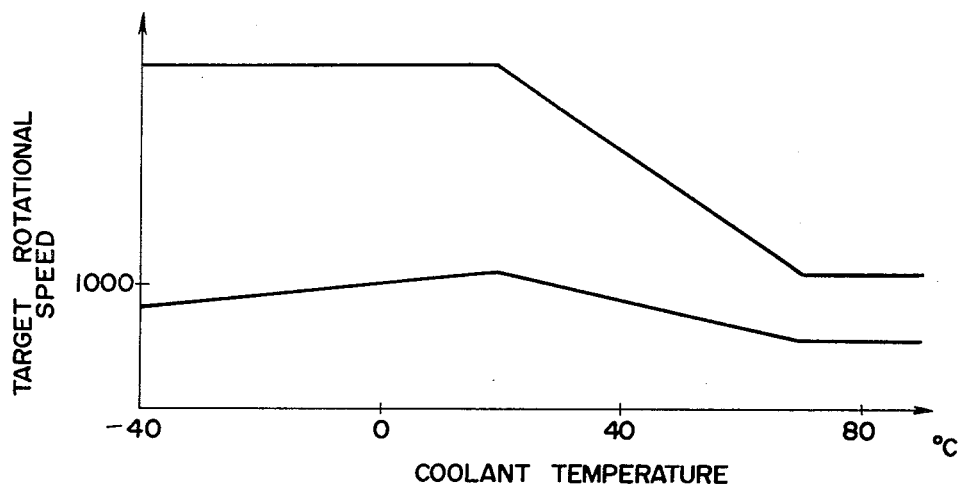
FIG. 4 is a diagram illustrating a relationship between a target rotational speed and an engine coolant temperature at a neutral position.
Figure 5:
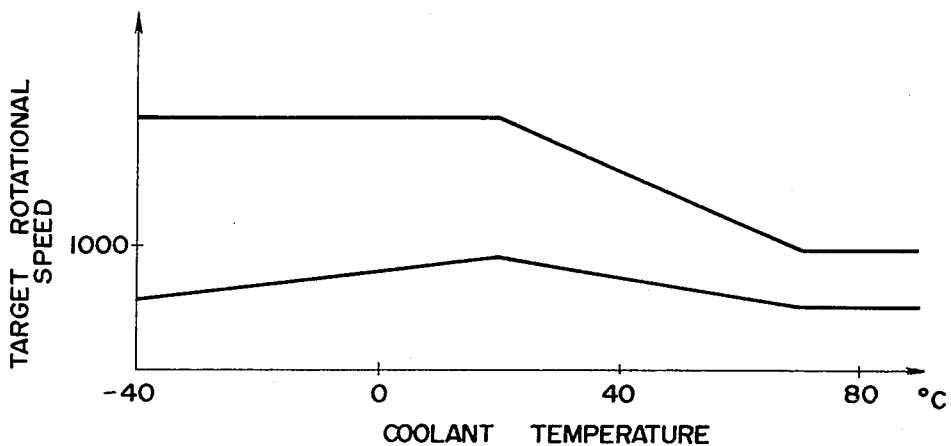
FIG. 5 is a diagram illustrating a relationship between a target rotational speed and an engine coolant temperature at a drive position.
Figure 6:
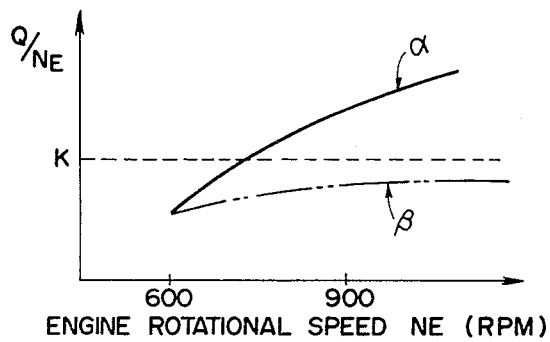
FIG. 6 is a diagram illustrating a relationship between ratio of intake air quantity to engine rotational speed and an engine rotational speed.

The ROM 52 of the electronic control circuit 48 stores therein tables shown in FIGS. 4 to 6. FIGS. 4 and 5 show charts of an engine coolant temperature versus a target rotational speed. FIG. 4 shows the chart for the neutral position (N range) and FIG. 5 shows the chart for the drive position (D range). FIG. 6 shows a chart of an engine rotational speed versus a ratio of intake air quantity Q to the engine rotational speed $N_E$. A curve $\alpha$ shows a characteristic curve in the idling condition is the D range and a curve $\beta$ shows a characteristic curve in deceleration condition in the D range.

Applied to the I/O 56 are the engine rotational speed signal from the distributor 36, the throttle position signal from the throttle sensor 10, the shift position signal from the shift position sensor 46, the ignition switch signal from the ignition switch 44, the ignition confirmation signal from the igniter 38, the vehicle speed signal, the air conditioner signal and the air-to-fuel ratio signal from the $O_2$ sensor 30, and the I/O 56 produces an intake air flow rate control device drive signal for controlling the intake air flow rate control device 18, a fuel injection signal for controlling the fuel injection device 22 and an ignition signal for controlling the igniter 38 and the like. The ADC 58 receives the intake air quantity signal from the air flow meter 4, the intake air temperature signal from the intake air temperature sensor 6 and the coolant temperature signal from the coolant temperature sensor 32. Those signals are converted to digital signals by the ADC 58.

The ROM 52 stores therein maps and tables for various operating conditions of the engine, in addition to the tables described above, and the I/O 56 and ADC 58 receive and supply various signals for the operating conditions of the engine, in addition to the signals described above.

The operation of the present embodiment thus constructed is now explained with reference to FIG. 7.

Figure 1:
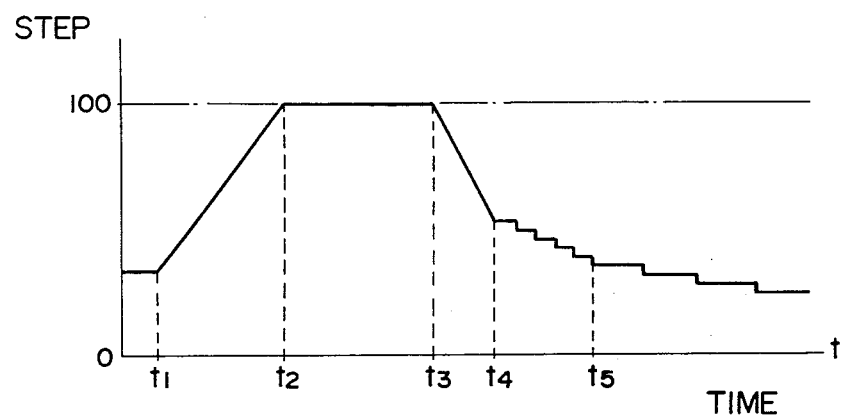
FIG. 1 is a time chart illustrating a change in the step position of a stepping motor.

FIG. 7 shows a flow chart illustrating a control sequence of the present embodiment. Prior to the start of control, the conditions are checked at a step 100. If the idling contact has been turned on from its off position by the signal from the throttle sensor 10, the vehicle speed signal from the vehicle speed sensor 42 is less than a predetermined level and a predetermined time period has elapsed since the start control (the step position is controlled between time $t_3$ and time $t_4$ in FIG. 1) was completed, then the sequence is shifted to a step 102. In the step 102, judgement is made whether the N range is used by the shift position signal from the shift position sensor 46, and if the N range is detected, the table shown in FIG. 4 is selected in a step 104 and in the following decision steps the table of FIG. 4 is looked up. If the decision in the step 102 is the D range, the sequence is shifted to a step 106 where the table of FIG. 5 is selected and in the following decision step the table of FIG. 5 is looked up. In a step 108, the engine rotational speed $N_E$ from the engine rotational speed sensor 36 is compared with a target rotational speed lower limit determined from the table described-above based on the signal from the engine coolant temperature sensor 32. If the engine rotational speed $N_E$ is lower than the target rotational speed lower limit, the sequence is shifted to a step 110 where the stepping motor 16 is controlled to advance by one step position and the incremented value (CRUN+1) is stored in the RAM 50. Then the sequence is shifted to a step 112. If the engine rotational speed $N_E$ is higher than the target rotational speed lower limit, the sequence is shifted to the step 112.

In the step 112 and the following steps, the stepping motor 16 is downward controlled. In the step 112, the engine rotational speed $N_E$ is compared with a target rotational speed upper limit, and if the former is higher, the sequence is shifted to a step 114 where a decision is made whether the N range is used. If the decision in the step 114 is the N range, the sequence is shifted to a step 116, and if the decision is non-N range, the sequence is shifted to a step 118. In the step 118, a ratio $Q/N_E$ of the intake air quantity signal Q from the intake air flow meter 4 to the engine rotational speed signal $N_E$ from the engine rotational speed sensor 36 is compared with a predetermined reference K (e.g. K=0.33) shown in the table of FIG. 6. If the decision in the step 118 indicates that the ratio $Q/N_E$ is smaller than the reference K, it is determined that the vehicle speed sensor 42 has failed and no drive signal is supplied to the stepping motor 16. Then this control sequence is completed. If the decision in the step 118 indicates that the ratio $Q/N_E$ is larger than the reference K, it is determined that the vehicle speed sensor 42 is normal and the sequence is shifted to the step 116. In the step 116, the stepping motor 16 is retarded by one step position and the decremented step position (CRUN−1) is stored in the RAM 50.

As described herein above, according to the preferred embodiment of the present invention, based on the fact that the ratio $Q/N_E$ is smaller than the reference K as shown by the curve $\beta$ in FIG. 6 in the deceleration condition in the D range, the stepping motor 16 is downward controlled when the ratio $Q/N_E$ is smaller than the reference K.

In accordance with the preferred embodiment of the present invention, the stepping motor is downward controlled only when the ratio of the intake air quantity signal to the engine rotational speed does not exceed the predetermined reference. Accordingly, the engine stall in the deceleration condition when the vehicle speed sensor fails can be prevented.

What is claimed is:

1. An engine idling rotational speed control device comprising:
    a throttle valve arranged in a first air intake passage;
    intake air flow rate control means arranged in a second air intake passage for controlling intake air quantity taken from said second air intake passage into an engine;
    a rotational speed sensor for sensing a rotational speed of said engine;
    an air flow rate sensor for sensing air quantity taken into said engine; and
    an electronic control circuit for driving said intake air flow rate control means such that the rotational speed of said engine in a substantially full-close position of said throttle valve is brought into a target rotational speed range related to at least an engine coolant temperature, comparing a value related to the intake air quantity sensed by said air flow rate sensor and the engine rotational speed sensed by said rotational speed sensor with a reference, determining, based on the result of comparison, if said intake air flow rate control means is to be downward controlled in a manner to decrease the air quantity taken from said second air intake passage, and, if a decision is is made that said intake air flow rate control means is not to be downward controlled.

2. An engine idling rotational speed control device according to claim 1, wherein said electronic control circuit effects said comparison when the actual rotational speed of said engine is higher than said target rotational speed and a gear position is at other than neutral position.

3. An engine idling rotational speed control device according to claim 1 or 2, wherein said electronic control circuit downward-controls said intake air flow rate control means only when a ratio of the intake air quantity to the actual rotational speed is higher than the reference.

4. An engine idling rotational speed control device according to claim 1 or 2, wherein said intake air flow rate control means includes a control valve arranged in said second air intake passage and a stepping motor for driving said control valve.

5. An engine idling rotational speed control device according to claim 3, wherein said intake air flow rate control means includes a control valve arranged in said second air intake passage and a stepping motor for controlling said control valve.

6. An engine idling rotational speed control device according to claim 5, wherein said air flow rate sensor is arranged upstream of said throttle valve.

7. An engine idling rotational speed control device according to claim 1, wherein said air flow rate sensor is arranged upstream of said throttle valve.

* * * * *